(12) United States Patent
Chou et al.

(10) Patent No.: US 12,086,463 B2
(45) Date of Patent: Sep. 10, 2024

(54) ABORT HANDLING BY HOST CONTROLLER FOR STORAGE DEVICE

(71) Applicant: MediaTek Inc., Hsinchu (TW)

(72) Inventors: Chih-Chieh Chou, Hsinchu (TW); Chia-Chun Wang, Hsinchu (TW); Liang-Yen Wang, Hsinchu (TW); Szu-Chi Liu, Hsinchu (TW); Chin Chin Cheng, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 123 days.

(21) Appl. No.: 17/724,286

(22) Filed: Apr. 19, 2022

(65) Prior Publication Data

US 2022/0350536 A1 Nov. 3, 2022

Related U.S. Application Data

(60) Provisional application No. 63/180,676, filed on Apr. 28, 2021.

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0679* (2013.01)

(58) Field of Classification Search
CPC .... G06F 3/0659; G06F 3/0604; G06F 3/0634; G06F 3/0679; G06F 3/0611; G06F 3/0607; G06F 3/0655; G06F 3/0658
USPC .......................................................... 711/154
See application file for complete search history.

(56) References Cited

U.S. PATENT DOCUMENTS

| 2014/0331001 | A1 | 11/2014 | Liu |
| 2015/0178017 | A1 | 6/2015 | Darrington |
| 2018/0217951 | A1* | 8/2018 | Benisty ............... G06F 13/1642 |
| 2022/0035565 | A1* | 2/2022 | Ki ........................ G06F 3/0604 |

* cited by examiner

*Primary Examiner* — Mardochee Chery
(74) *Attorney, Agent, or Firm* — Tong J. Lee (57) ABSTRACT

A host system coupled to a storage system provides hardware support for command abort. The host system includes a host controller, which detects that a host driver has disabled an enable indicator of a submission queue (SQ). In response to the detection, the host controller stops further fetching from the SQ. The host controller sends all entries that have been fetched from the SQ to the storage device, and sets a status indicator of the SQ to indicate stopped fetching of the SQ.

20 Claims, 6 Drawing Sheets

ABORT HANDLING BY HOST CONTROLLER FOR STORAGE DEVICE

CROSS-REFERENCE TO RELATED APPLICATIONS

This application claims the benefit of U.S. Provisional Application No. 63/180,676 filed on Apr. 28, 2021, the entirety of which is incorporated by reference herein.

TECHNICAL FIELD

Embodiments of the invention relate to a storage device; more specifically, to the management of data transfer between a host and a storage device.

BACKGROUND

An electronic system typically includes a host coupled to a storage device. The host and the storage device are interconnected through an interface such as a Universal Flash Storage (UFS) interface, a Serial Advanced Technology Attachment (SATA) interface, a Small Computer Small Interface (SCSI), a Serial Attached SCSI (SAS), an embedded Multi-Media Card (eMMC) interface, etc.

The UFS interface is primarily for use in mobile systems between a host and a non-volatile memory (NVM) storage device. The host includes a host controller, which is responsible for managing data transfer between host software and a UFS storage device.

When an error condition occurs in the electronic system, host software may abort a data transfer command. For example, an error condition may be caused by a software crash, electrical or network problems, or other abnormalities during runtime. However, a race condition may arise between a) the host controller sending a command to be aborted to the storage device, and b) the storage device responding to the host software's query on whether the command has been received by the device. There is no certainty regarding whether or not the storage device has received the command to be aborted. This situation may occur when the host controller has fetched the command but is too busy to send it to the storage device. Without this certainty, the host software may repeatedly query the storage device to check whether the storage device has received the command. The repeated queries can result in an increase in latency and data transmissions between the host and the storage device. Thus, there is a need for improving the management of data transfers between a host and a storage device.

SUMMARY

In one embodiment, a method is performed by a host system coupled to a storage system. The method comprises a host controller detecting that a host driver has disabled an enable indicator of a submission queue (SQ). The host controller stops further fetching from the SQ, and sends sending all entries that have been fetched from the SQ to the storage device. The host controller then sets a status indicator of the SQ to indicate stopped fetching of the SQ.

In another embodiment, a host system coupled to a storage system includes a host controller, one or more processors to execute operations of a host driver, and memory to store the host driver and multiple SQs. The host controller is operative to detect that the host driver has disabled an enable indicator of an SQ; stop further fetching from the SQ; and send all entries that have been fetched from the SQ to a storage device coupled to the host system. The host controller then sets a status indicator of the SQ to indicate stopped fetching of the SQ.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide hardware support for a host driver to abort a command directed at a storage system. The host driver is in a host system coupled to the storage device. A number of registers are provided for the host driver to check whether or not the command has been sent to the storage device. Methods for using the registers are also provided. The methods define the steps to be followed by the host driver and host hardware in the host system.

In one embodiment, the hardware support may be implemented by a set of submission queue (SQ) enable indicators and a set of SQ status indicators. These indicators may be stored in the registers of the host system. For each SQ, an SQ enable register stores a 1-bit value (SQx.Enable) as the enable indicator, and an SQ status register stores a 1-bit value (SQx.Status) as the status indicator. By changing the bit value of SQx.Enable, the host driver can enable and disable the host controller's further fetching from the corresponding SQ. By changing the bit value of SQx.Status, the host controller can assure the host driver that all commands that have already been fetched from the SQ, or are in the process of being fetched from the SQ, are sent to the storage device. Thus, when the host driver aborts a command and that command has been fetched from the SQ, the host driver can be assured that the command has been sent to the storage device. Thus, there is no need to repeatedly query the storage device for confirmed receipt of the command.

Figure 1:
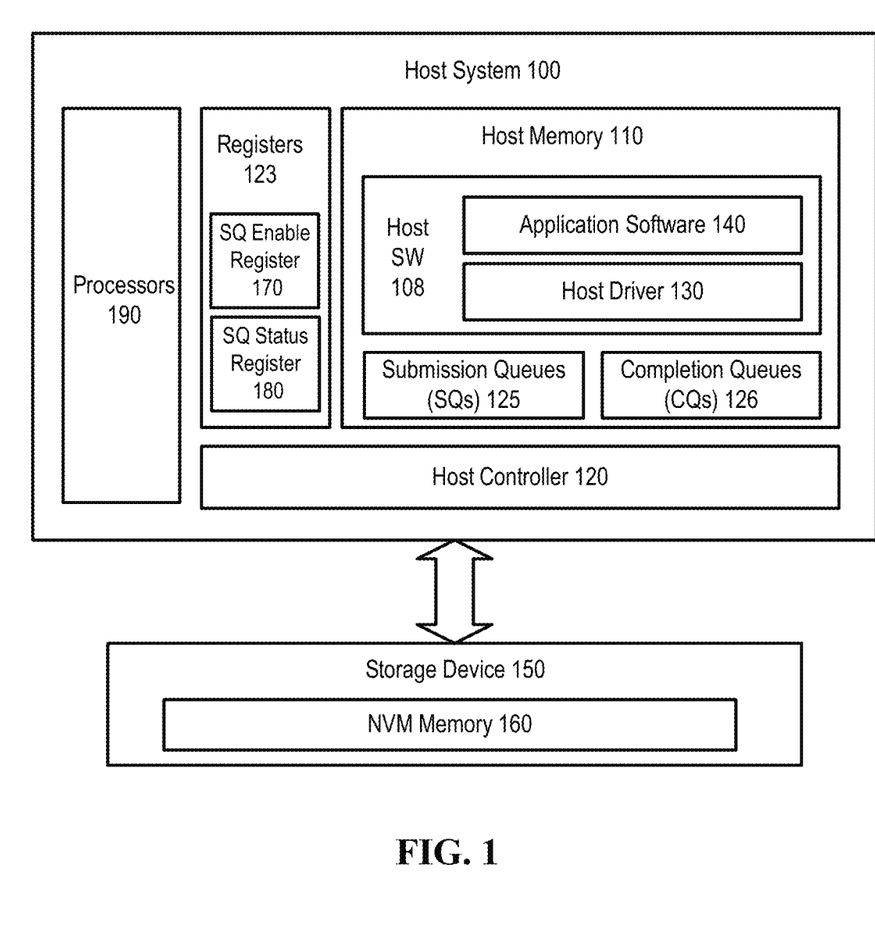
FIG. 1 is a block diagram illustrating a host system coupled to a storage system according to one embodiment.

FIG. 1 is a block diagram illustrating a host system 100 coupled to a storage device 150 (also referred to as a device) according to one embodiment. The host system 100 includes host software 108 such as a host driver 130 and application software 140. The host software 108 may be stored in host memory 110 of the host system 100. The host memory 110 may include memory devices such as dynamic random access memory (DRAM), static RAM (SRAM), and/or other volatile and non-volatile memory. The host system 100 also includes one or more processors 190 such as general-purpose processors (e.g., a central processing unit (CPU), a digital signal processor (DSP), a graphics processing unit (GPU), etc.) and/or special-purpose circuits to perform the operations of the host software 108. In one embodiment, the host system 100 may be a multi-core system.

The host system 100 also includes a host controller 120 to manage data transfer between the host system 100 and the storage device 150. The host controller 120 may be implemented by a combination of processing hardware and software programs. An example of NVM memory is flash memory. In one embodiment, the host system 100 may be integrated as a system-on-a-chip (SOC). It is understood the embodiment of FIG. 1 is simplified for illustration purposes. Additional hardware components may be included.

The storage device 150 includes storage units such as non-volatile memory (NVM) memory 160. In one embodiment, the storage device 150 is a UFS device. That is, the exchange of requests, data, and responses between the host controller 120 and the storage device 150 follows a standard such as the UFS standard. Although UFS is described in the disclosure, it should be understood that the method and system described herein can be applied to other storage system standards.

Referring to the host system 100 as "host" and the storage device 150 as "device," each UFS command includes three phases: a request phase (from host to device), a data in/out phase (from device to host, or from host to device), and a response phase (from device to host). In this disclosure, when the host fetches and sends a command to the device, it is the request phase of the command that is described.

In one embodiment, the host system 100 manages multiple queues in the host memory 110. The multiple queues include a set of submission queues (SQs) 125 and a set of completion queues (CQs) 126. The host controller 120 and the host driver 130 may communicate via these queues and a set of registers 123. For each SQ 125, the host driver 130 is the producer and the host controller 120 is the consumer. The host driver 130 uses the SQs 125 to submit command descriptors to the host controller 120, indicating the commands to be processed by the storage device 150. It should be understood that, for ease of description, in this disclosure "submitting a command to an SQ" and "fetching a command from an SQ" are used interchangeably as "submitting a command descriptor to an SQ" and "fetching a command descriptor from the SQ," respectively. A command descriptor identifies a command and points to the instructions of the command stored in the host memory 110.

Each SQ 125 identifies the CQ 126 that will receive its command completion notification. For each CQ 126, the host controller 120 is the producer and the host driver 130 is the consumer. The host controller 120 uses the CQs 126 to indicate an overall command status (OCS) to the host driver 130. Each CQ entry identifies in which SQ the command originated, the unique identifier for that command, and an OCS field.

For example, the host driver 130 can request, on behalf of the application software 140, data transfer to the storage device 150 by writing a command in the form of a command descriptor to one of the SQs 125. The host controller 120 sends the commands in the SQ to the storage device 150 in the order that they are placed into the SQ. After the storage device 150 executes a command, it notifies the host controller 120 of the completion. The host controller 120 posts the completion information in a CQ corresponding to the originating SQ to inform the host driver 130 of the completion of the requested data transfer.

In one embodiment, both the SQs 125 and the CQs 126 are circular queues and are collectively referred to as multi-circular queues (MCQs). A circular queue uses a head pointer and a tail pointer to keep track of its current content. Queue entries are removed from the head of the queue for processing and new entries are added to the tail of the queue.

In one embodiment, the registers 123 include an SQ enable register 170 and an SQ status register 180. The SQ enable register 170 includes a 1-bit SQ enable indicator for each SQ for the host driver 130 to indicate whether the SQ is enabled or disabled for fetching. The SQ status register 180 includes a 1-bit SQ status indicator for each SQ for the host controller 120 to confirm that the corresponding SQ is running or stopped for fetching. For each SQ, the host driver 130 can enable and disable the host controller's fetching operations by setting the 1-bit SQ enable indicator in the SQ enable register 170. For each SQ, the host controller 120 can inform the host driver 130 of the SQ's status (e.g., stopped or running) by setting the 1-bit SQ status indicator in the SQ status register 180.

Figure 2:
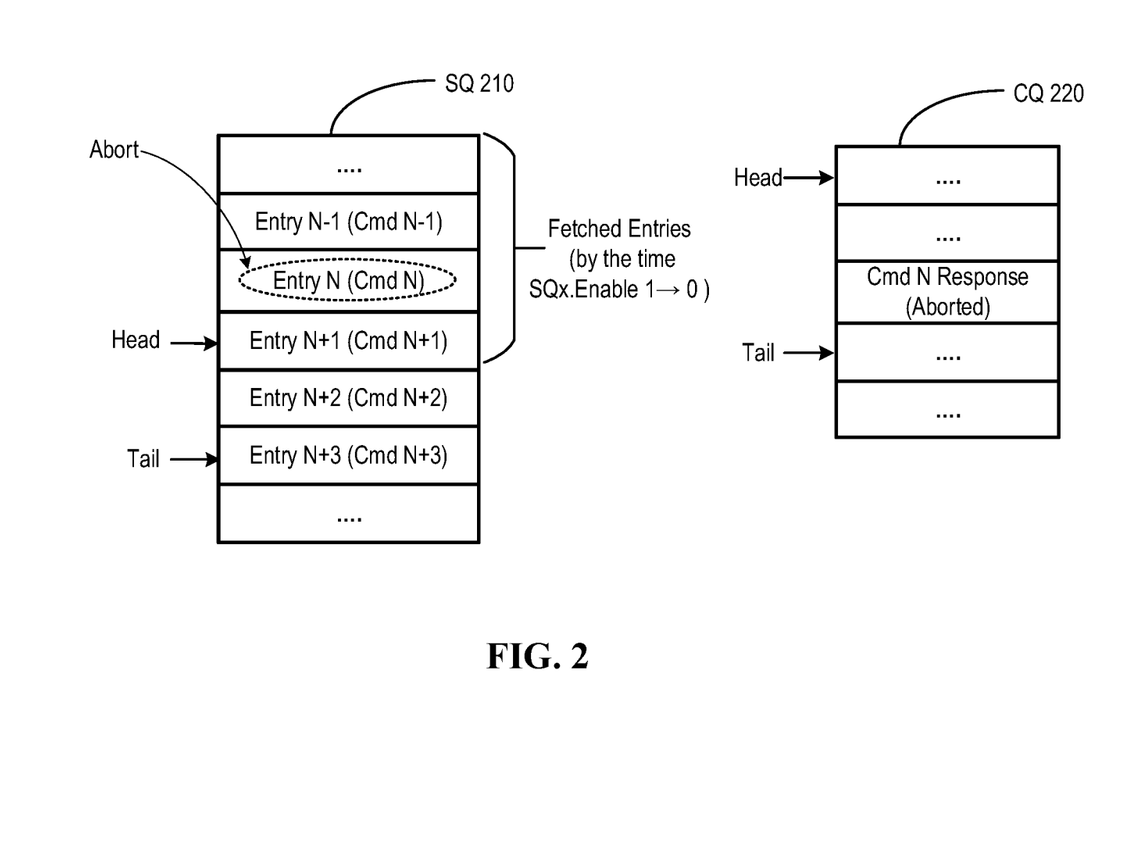
FIG. 2 is a diagram illustrating a submission queue (SQ) and a completion queue (CQ) according to one embodiment.

FIG. 2 is a diagram illustrating a submission queue (SQ) 210 and a completion queue (CQ) 220 according to one embodiment. Referring also to FIG. 1, SQ 210 may be any of SQs 125, and CQ 220 may be any of CQs 126. Both SQ 210 and CQ 220 are circular queues, and each queue has a head pointer and a tail pointer. The head pointers and the tail pointers may be stored in the registers 123 of FIG. 1. The host driver 130 may add an entry (e.g., Entry N+3) to SQ 210 and update the tail pointer of SQ 210 to point to the added entry. The host controller 120 may fetch an entry (e.g., Entry N+1) from SQ 210 and update the head pointer of SQ 210 to point to the entry (e.g., Entry N+1).

For simplicity of description, SQ entries and the commands in the SQ entries use the same numerical indices; e.g., entry N contains command N. It should be understood that the indices are used to indicate the placement order in the queue. Thus, command N can be any data transfer command or request in compliance with a predetermined protocol.

In one embodiment, each SQ has a corresponding CQ. In this example, CQ 220 is a corresponding completion queue to SQ 210. That is, after the host controller 120 sends command N to the storage device 150 and the storage device 150 completes the requested operations, the host controller 120 updates CQ 220 with the response from the storage device 150 to indicate the completion of command N. The host controller 120 places the response at the tail of CQ 220 and updates the tail pointer of CQ 220 to point to that response.

In one embodiment, when the host software 108 aborts command N, the host driver 130 and the host controller 120 coordinate their operations with respect to the stopping and resuming of fetching from SQ 210. The coordination is performed with the enable indicator (SQx.Enable) and the status indicator (SQx.Status) of SQ 210. The suffix 'x' in SQx represents the index for identifying an SQ. The enable indicator may be stored in the SQ enable register 170 and the status indicator may be stored in the SQ status register 180.

Figure 3:
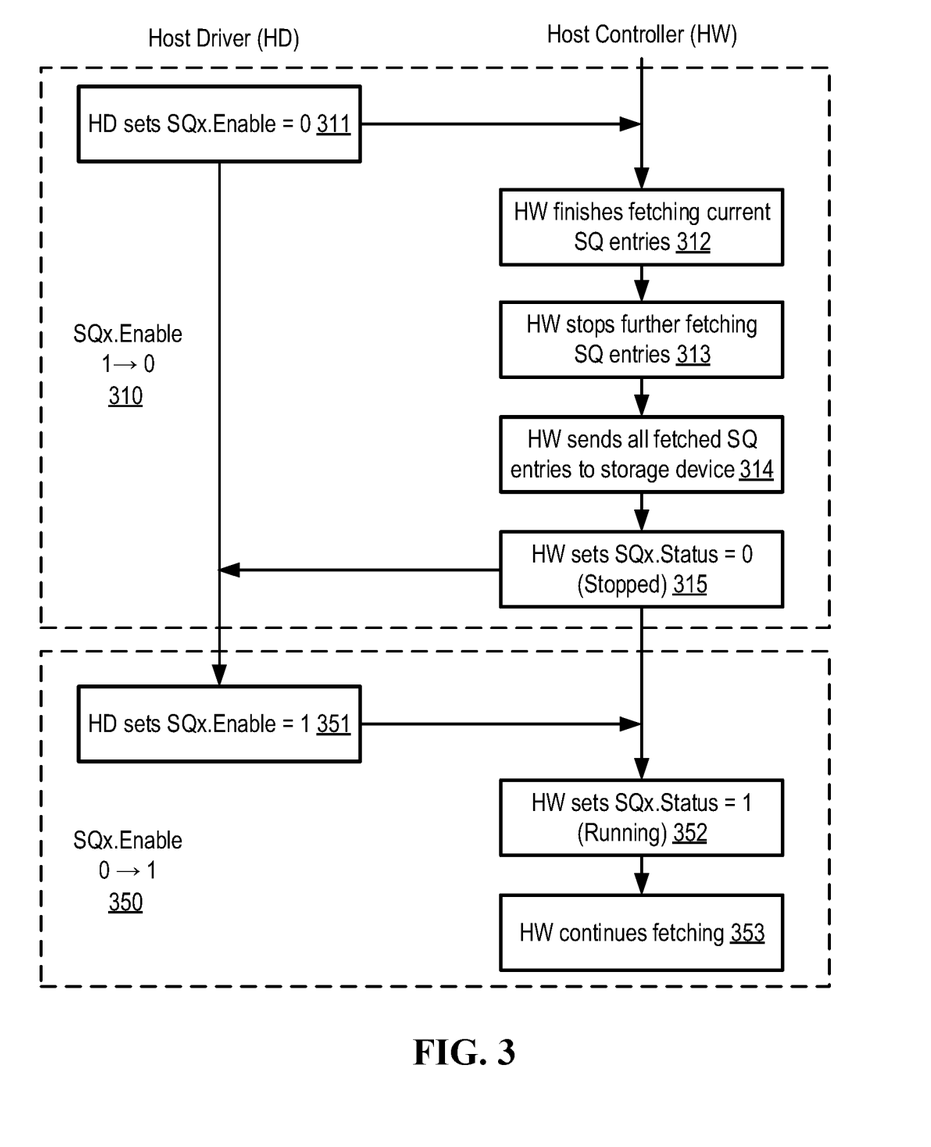
FIG. 3 is a diagram illustrating host system operations to enable and disable SQ fetching according to one embodiment.

FIG. 3 is a diagram illustrating host system operations to enable and disable SQ fetching according to one embodiment. The top block 310 includes the steps for disabling further fetching of an SQ, and the bottom block 350 includes the steps for enabling fetching of the SQ. Referring also to FIG. 1, the host driver (HD) indicated in FIG. 3 may be the host driver 130, and the hardware (HW) may be the host controller 120. The host driver sets SQx.Enable=0 at the beginning of abort initiation to stop the hardware from further fetching the SQ. The host driver sets SQx.Enable=1 to re-start the fetching of the SQ. The hardware sets SQx.Status=0 to indicate that all fetched commands have been sent to the storage device, and sets SQx.Status=1 to indicate that fetching of the SQ has re-started.

The following description provides further details of the top block 310; i.e., SQx.Enable 1→0. At step 311, when the host driver sets the enable indicator SQx.Enable=0, the hardware detects that the SQx.Enable register value has changed from 1 to 0; i.e., by falling edge detection. Upon detecting that SQx.Enable has changed from 1 to 0, the hardware finishes fetching the current entries at step 312, and stops further fetching SQ entries at step 313. The hardware at step 314 sends all fetched SQ entries (up to the time when SQx.Enable 1→0 is detected) to the storage device. Then at step 315 the hardware sets SQx.Status=0 to indicate that fetching of the SQ has stopped and all fetched SQ entries have been sent to the storage device.

When the host driver initiates an abort of command N and changes SQx.Enable from 1 to 0, the hardware completes the fetching of the current command and sends all fetched commands to the storage device. In an embodiment, the fetched and sent commands include command N. Command N is "currently in execution" in such an embodiment. By "currently in execution," it means that the host controller has fetched or is in the process of fetching the command. The use of SQx.Enable 1→0 and SQx.Status=0 provides certainty to the host driver and the host hardware that command N is fetched and sent to the storage device.

The following description provides further details of the bottom block 350; i.e., SQx.Enable 0→1. At step 351, the host driver sets the enable indicator SQx.Enable=1. The setting of the enable indicator to 1 is triggered when the abort is handled in one of the possible ways; for example, the storage device completes command N before the command abort takes place, the host controller skips the fetching of command N from the SQ, or the storage device completes the abort of command N. The hardware detects SQx.Enable has changed from 0 to 1 (e.g., by rising edge detection), and at step 352 sets SQx.Status=1 to indicate that fetching of the SQ has resumed. The hardware then continues fetching from the SQ at step 353.

It is understood that in alternative embodiments the meaning of the binary values 0 and 1 may be reversed. For example, the enable indicator value of 1 may represent disabled fetching, and 0 may represent enabled fetching. Likewise, the status indicator value of 1 may represent stopped fetching and 0 may represent resumed fetching.

Figure 4:
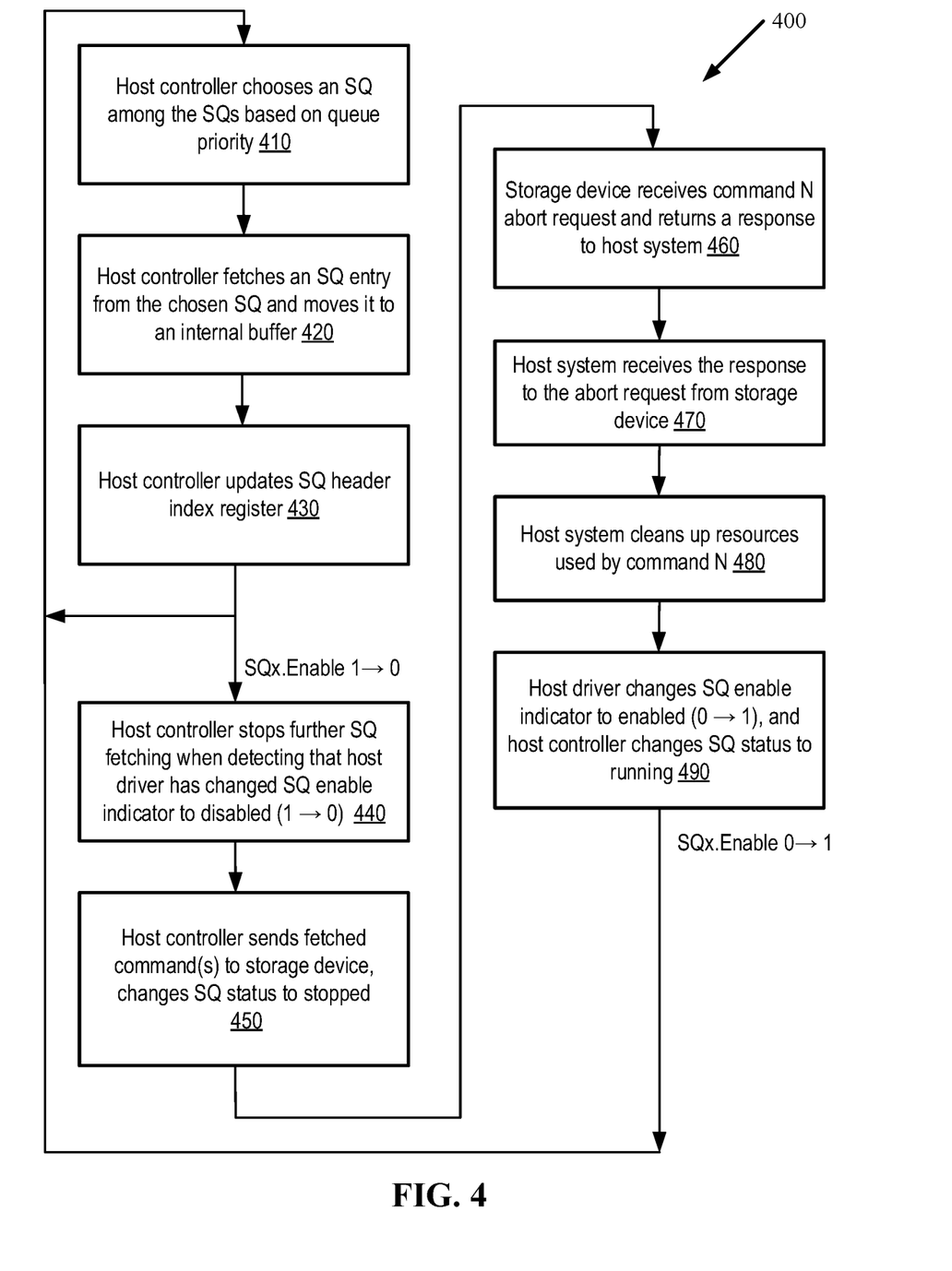
FIG. 4 is a flow diagram illustrating a usage example of an SQ enable indicator and an SQ status indicator according to one embodiment.

FIG. 4 is a flow diagram 400 illustrating a usage example of the SQ enable indicator and the SQ status indicator according to one embodiment. Referring also to FIG. 1, the host controller and the host driver in FIG. 4 may be the host controller 120 and the host driver 130 in FIG. 1, respectively. As mentioned before, the host driver places SQ entries at the tail end of the SQs, and the host controller fetches SQ entries from the head end of the SQs. At step 410, the host controller chooses an SQ among the multiple SQs based on the queue priority. At step 420, the host controller fetches an SQ entry from the chosen SQ and moves the entry to an internal buffer. At step 430, the host controller updates the SQ header index register. The host controller may repeatedly perform steps 410-430 for all of the SQs. At some point during steps 410-430, the host driver initiates an abort of a command N that has been fetched or is in the process of being fetched from a given SQ (e.g., SQx), and changes the enable indicator of SQx from 1 to 0 (i.e., SQx.Enable 1→0) to stop further fetching from the given SQ. The host controller at step 440 detects SQx.Enable 1→0. The host controller finishes fetching the current SQ entry, if any, and stops further fetching. The host controller at step 450 sends all fetched command(s) from the internal buffer to the storage device, and changes SQx.Status from 1 to 0 to indicate fetching at SQx has stopped and all fetched SQx entries have been sent to the storage device.

The following steps describe the scenario in which the storage device completes the command abort. In such a scenario, the host driver sends a Task Management request to inform the storage device to abort command N, which is identified by a unique tag. The storage device at step 460 receives the Task Management request to abort command N and aborts command N accordingly. The host system at step 470 receives a response to the abort request from the storage device. At step 480, the host system cleans up resources used by command N. At step 490, the host driver changes SQ enable indicator to enabled (i.e., SQx.Enable 0→1), and the host controller changes SQ status to running (i.e., resumed fetching).

At step 430, the head pointer may point to an entry that has been fetched or is in the process of being fetched. That is, all of the SQ entries before and including the one pointed by the head pointer may have been fetched, but may or may have not been sent out to the storage device. The use of SQx.Enable in this scenario ensures that the host controller sends out all SQ entries fetched by the host controller.

Figure 5:
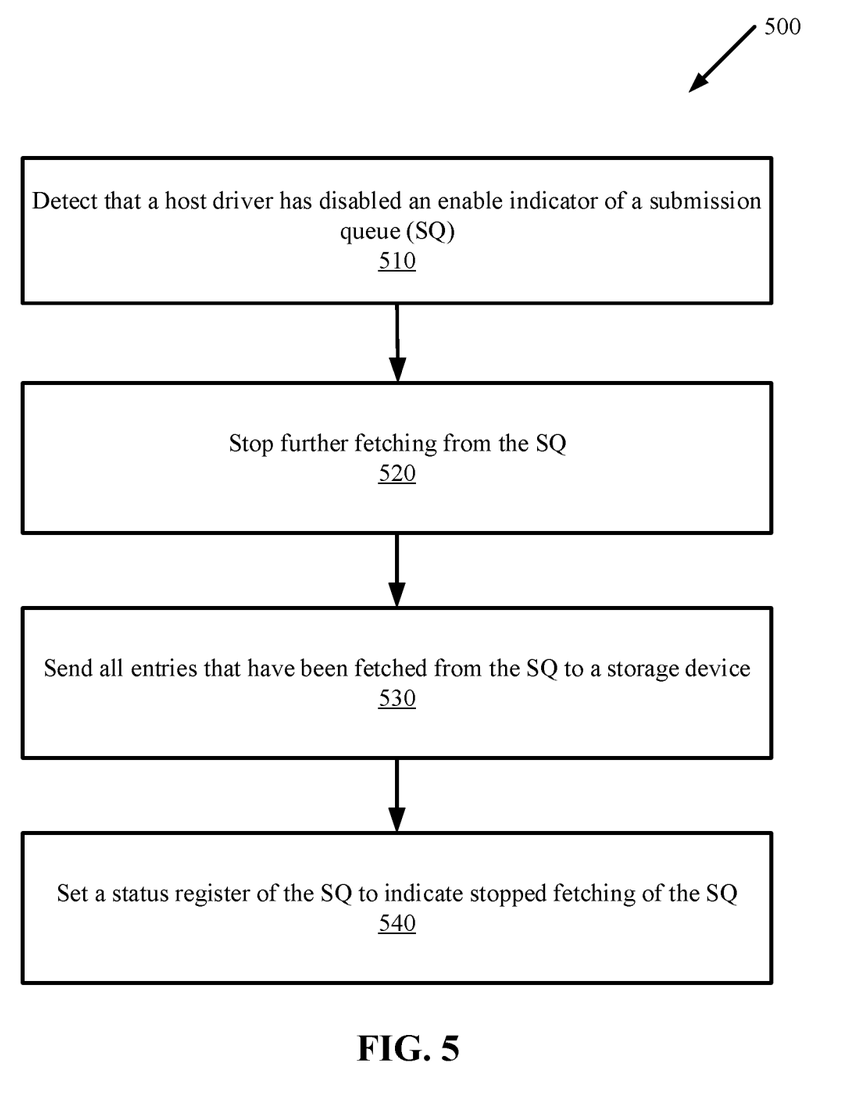
FIG. 5 is a flow diagram illustrating a method of a host controller in response to a disabled indication of an SQ according to one embodiment.

FIG. 5 is a flow diagram illustrating a method 500 of a host system coupled to a storage device according to one embodiment. More specifically, method 500 may be performed by a host controller in response to a disabled indication of an SQ. The host controller at step 510 detects that a host driver has disabled an enable indicator of an SQ (e.g., SQx.Enable 1→0). The host controller at step 520 stops further fetching from the SQ. The host controller at step 530 sends all entries that have been fetched from the SQ to the storage device. The host controller at step 540 sets a status register of the SQ to indicate stopped fetching of the SQ (e.g., SQx.Status=0).

Figure 6:
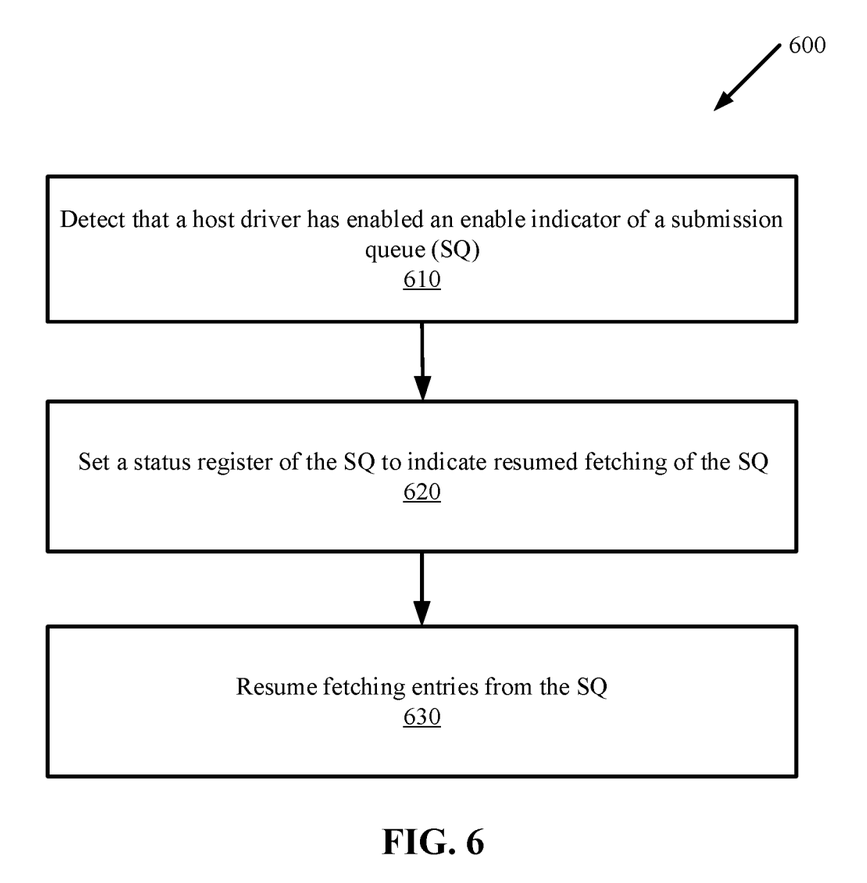
FIG. 6 is a flow diagram illustrating a method of a host controller in response to an enabled indication of an SQ according to one embodiment.

FIG. 6 is a flow diagram illustrating a method 600 of a host controller in response to an enabled indication of the SQ according to one embodiment. The host controller at step 610 detects that a host driver has enabled the enable indicator of the SQ (e.g., SQx.Enable 0→1). The host controller at step 620 sets the status register of the SQ to indicate resumed fetching of the SQ (e.g., SQx.Status=1). The host controller at step 630 resumes fetching entries from the SQ.

In one embodiment, when detecting the disabling of the enable indicator, the host controller finishes fetching any entry that is in the process of being fetched from the SQ and sends the entry to the storage device. In one embodiment, after the status indicator is set to indicate stopped fetching, the host system sends an abort request to the storage device to abort a command that has been fetched and sent from the SQ to the storage device. The host driver enables the enable indicator of the SQ after the host system receives a response to the abort request from the storage system.

In one embodiment, the enable indicator for the SQ is a 1-bit value writable by the host driver to enable or disable fetching. The status indicator for the SQ is a 1-bit value writable by the host controller to indicate stopped or resumed fetching.

In one embodiment, the SQ is a circular queue and the host controller has fetched all of the entries before the head pointer of the SQ. The host controller can detect a change in the enable indicator by falling-edge or rising-edge detection. In one embodiment, the host controller communicates with the storage device according to a Universal Flash Storage (UFS) standard.

In the preceding description, the host driver is described as part of the host software. However, it should be understood that some operations of the host driver described herein can be performed by host hardware. For example, host hardware may perform the operations of the host driver to enable and/or disable the enable indicator of an SQ.

The operations of the flow diagrams of FIGS. 4-6 have been described with reference to the exemplary embodiment of FIG. 1. However, it should be understood that the operations of the flow diagrams of FIGS. 4-6 can be performed by embodiments of the invention other than the embodiment of FIG. 1, and the embodiment of FIG. 1 can perform operations different than those discussed with reference to the flow diagrams. While the flow diagrams of FIGS. 4-6 show a particular order of operations performed by certain embodiments of the invention, it should be understood that such order is exemplary (e.g., alternative embodiments may perform the operations in a different order, combine certain operations, overlap certain operations, etc.).

Various functional components, blocks, or modules have been described herein. As will be appreciated by persons skilled in the art, the functional blocks or modules may be implemented through circuits (either dedicated circuits or general-purpose circuits, which operate under the control of one or more processors and coded instructions), which will typically comprise transistors that are configured in such a way as to control the operation of the circuity in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method of a host system coupled to a storage system, comprising:
    detecting, by a host controller, that a host driver has disabled an enable indicator of a submission queue (SQ); and
    in response to disabling of the enable indicator, the method of the host controller comprising:
        stopping further fetching from the SQ;
        sending all entries that have been fetched from the SQ to the storage device; and
        setting, by the host controller, a status indicator of the SQ to indicate stopped fetching of the SQ.

2. The method of claim 1, further comprising:
    detecting, by the host controller, that the host driver has enabled the enable indicator of the SQ;
    setting, by the host controller, the status indicator of the SQ to indicate resumed fetching from the SQ; and
    resuming fetching entries from the SQ.

3. The method of claim 1, wherein when detecting the disabling of the enable indicator, the method further comprises:
    finishing fetching an entry that is in process of being fetched from the SQ; and
    sending the entry to the storage device.

4. The method of claim 1, further comprising:
    after the status indicator is set to stopped fetching, sending an abort request from the host system to the storage device to abort a command that has been fetched and sent from the SQ to the storage device.

5. The method of claim 4, wherein the host driver enables the enable indicator of the SQ after the host system receives a response to the abort request from the storage device.

6. The method of claim 1, wherein the enable indicator for the SQ is a 1-bit value writable by the host driver to indicate enabled or disabled fetching.

7. The method of claim 1, wherein the status indicator for the SQ is a 1-bit value writable by the host controller to indicate stopped or resumed fetching.

8. The method of claim 1, wherein the SQ is a circular queue and the host controller has fetched all of the entries before a head pointer of the SQ.

9. The method of claim 1, wherein the host controller detects a change in the enable indicator by falling-edge or rising-edge detection.

10. The method of claim 1, wherein the host controller communicates with the storage device according to a Universal Flash Storage (UFS) standard.

11. A host system comprising:
    a host controller;
    one or more processors to execute operations of a host driver; and
    memory to store the host driver and a plurality of submission queues (SQs), wherein the host controller is operative to:
        detect that the host driver has disabled an enable indicator of an SQ; and
        in response to disabling of the enable indicator, perform the following operations:
            stop further fetching from the SQ;
            send all entries that have been fetched from the SQ to a storage device coupled to the host system; and
            set a status indicator of the SQ to indicate stopped fetching of the SQ.

12. The host system of claim 11, wherein the host controller is further operative to:
    detect that the host driver has enabled the enable indicator of the SQ;
    set the status indicator of the SQ to indicate resumed fetching from the SQ; and
    resume fetching entries from the SQ.

13. The host system of claim 11, wherein the host controller is further operative to:
    finish fetching an entry that is in process of being fetched from the SQ; and send an entry that is in process of being fetched from the SQ to the storage device.

14. The host system of claim 11, wherein, after the status indicator is set to stopped fetching, the host system is further operative to:
send an abort request to the storage device to abort a command that has been fetched and sent from the SQ to the storage device.

15. The host system of claim 14, wherein the enable indicator of the SQ is enabled after the host system receives a response to the abort request from the storage device.

16. The host system of claim 11, wherein the enable indicator for the SQ is a 1-bit value in an enable register writable by the host driver to indicate enabled or disabled fetching.

17. The host system of claim 11, wherein the status indicator for the SQ is a 1-bit value in a status register writable by the host controller to indicate stopped or resumed fetching.

18. The host system of claim 11, wherein the SQ is a circular queue and the host controller has fetched all of the entries before a head pointer of the SQ.

19. The host system of claim 11, wherein the host controller detects a change in the enable indicator by falling-edge or rising-edge detection.

20. The host system of claim 11, wherein the host controller communicates with the storage device according to a Universal Flash Storage (UFS) standard.

* * * * *